Jan. 3, 1939. A. J. OTTO 2,142,616
DAMPER
Filed Sept. 20, 1937 2 Sheets-Sheet 1

Inventor
Arthur J. Otto

By
Dodge
Attorneys

Jan. 3, 1939. A. J. OTTO 2,142,616
DAMPER
Filed Sept. 20, 1937 2 Sheets-Sheet 2

Inventor
Arthur J. Otto
By Dodge and Sons
Attorneys

Patented Jan. 3, 1939

2,142,616

UNITED STATES PATENT OFFICE 2,142,616

DAMPER

Arthur J. Otto, Milwaukee, Wis., assignor to Johnson Service Company, Milwaukee, Wis., a corporation of Wisconsin Application September 20, 1937, Serial No. 164,829

4 Claims. (Cl. 98—110)

This invention relates to louver dampers and particularly to the type in which alternate louvers overlap when closed and turn in reverse angular directions in moving from closed to open position. This opening characteristic is desirable because the air stream is not laterally deflected in the partially open positions of the louvers.

Arrangements heretofore devised to actuate such dampers have been complicated and expensive, and because they included pin slot connections involving lost motion and friction were noisy in action and hard to operate.

The problem arises from the fact that the louvers overlap. It is even more difficult when they overlap and have inter-engaging grooves and flanges. In either case, and particularly when there is inter-engagement, the overlapping louver (i. e. the one which overlies on the side toward which opening movement occurs and hence leads in opening) must move decidedly faster at the commencement of opening. Otherwise two adjacent louvers would interfere.

A second requirement is that in full open position all louvers should be parallel with each other and with the direction of air flow.

These requirements are met by the invention, which provides a simple linkage devoid of cams, lost-motion connections, slides and other sources of noise and friction. The device is economical to construct, easy to operate, not subject to undue wear, and operates positively and silently.

When two lever arms, swinging about spaced fixed axes, are connected by a link, their respective angular velocities at any instant are inversely proportional to the lengths of the perpendiculars from the respective axes to the link. This principle is availed of in the structure hereinafter described.

The interconnection between two reversely turning louvers or two sets of alternating reversely turning louvers, comprises at least two lever arms, one arm on each louver (or set of connected louvers) and a connecting link, all so arranged that in closed position of the louvers, the length of the perpendicular to the link from the axis of the overlapping louver is much shorter than the length of the perpendicular to the link from the axis of the other or overlapped louver. Hence when the louvers start to move from closed position, the overlapping louver which leads in opening movement initially moves faster and clears the edge of the slower moving overlapped louver.

The application of the invention to a four louver damper is shown in the accompanying drawings, in which,—

Figure 1:
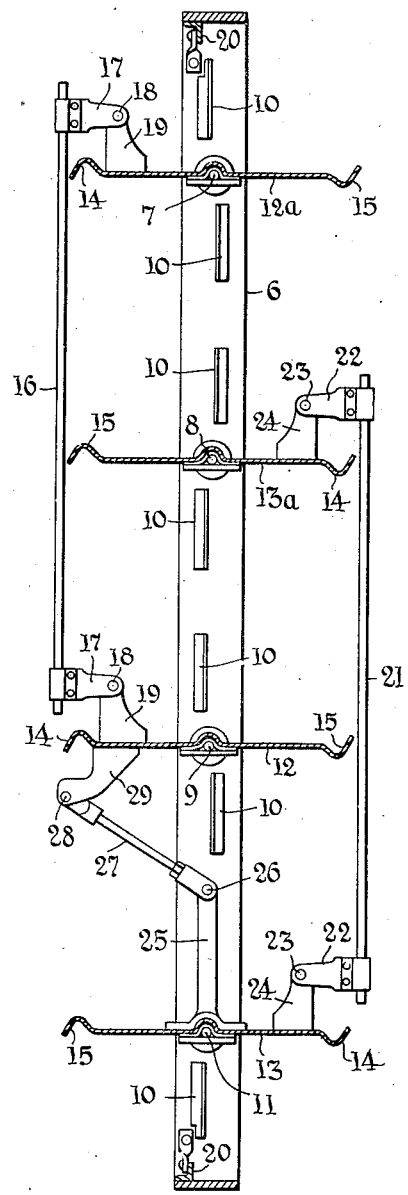
Fig. 1 is a section showing the open position of the louvers.

A rectangular open frame 6 of usual form rotatably supports four louver shafts 7, 8, 9, 11, each of which carries fixed to it a corresponding louver blade 12a, 13a, 12, 13. Each blade has opposite offset channel edges 14, 15, which engage and seal when the damper is closed. (See Fig. 2.) Suitable stops 10 and sealing strips 20 are carried by frame 6, as shown.

The blades 12 and 12a swing in the same angular direction being connected to move in unison by a reach rod 16 with offsets 17 pivoted at 18 to lugs 19 similarly located on the blades 12 and 12a. The lugs afford necessary clearance (see Fig. 1). Blades 12 and 12a are the overlapping blades.

The reversely turning overlapped blades 13 and 13a are connected to move in unison by reach rod 21 with offsets 22 pivoted at 23 to lugs 24.

Projecting radially with respect to louver shaft 11, and normal to the plane of louver 13 to which it is rigidly attached, is arm 25 pinned at 26 to link 27. The other end of link 27 is pinned at 28 to a lug 29 fast on louver 12. Lug 29 with pin 28 is the mechanical equivalent of an arm whose center line leads from the center of shaft 9 to the center of pin 28.

In the closed position the center line of link 27 is nearly in alinement with the center line just defined, but passes slightly to the left of shaft 9.

It follows that when louvers 12 and 13 move in unison, but in reverse angular directions, the initial angular velocity of louver 12 is higher as compared to that of 13. Thus during the initial opening movement louver 12 and connected louver 12a move to clear louver 13 and 13a respectively. All the louvers reach full open position simultaneously.

As the dimensions work out in practice the link 27 is only slightly longer than the arms 25 and 29 (the latter arm being measured from 9) radially to the center of pin 28). Arm 25 is equal in length to half the distance on centers between shafts 9 and 11 and arm 29 is slightly longer.

These dimensions give a neat and compact structure.

Figure 2:
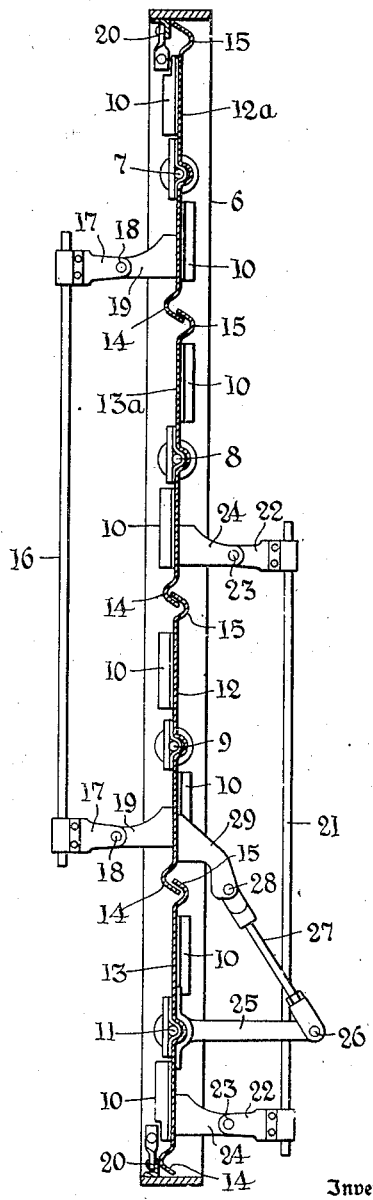
Fig. 2 is a similar view showing the closed position of the louvers.
Figure 3:
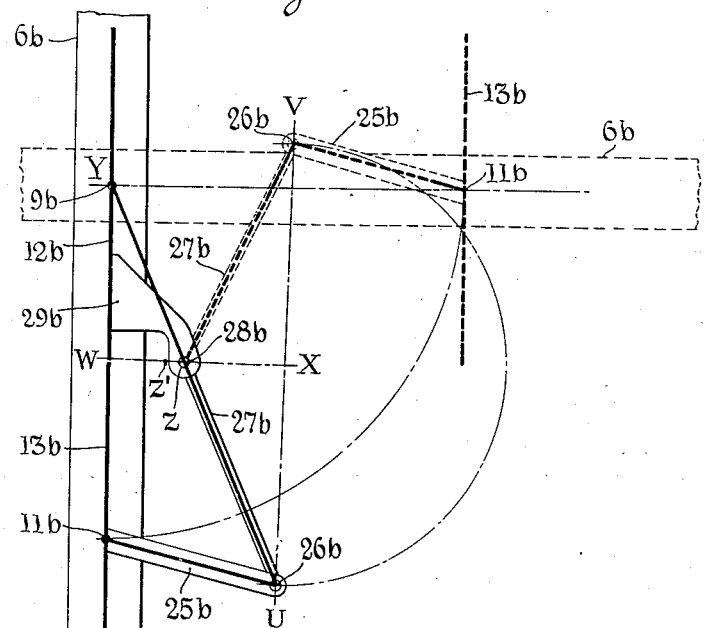
Fig. 3 is a diagram of the linkage showing the general case.
Figure 4:
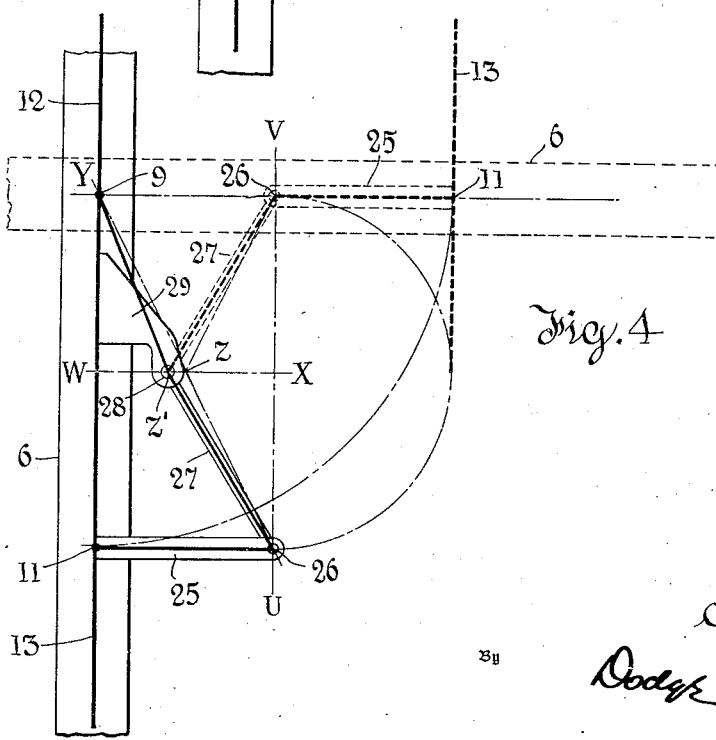
Fig. 4 is a similar diagram showing the special case, which is preferred and shown in Figs. 1 and 2.

To explain how such linkages are laid out, reference will first be made to Fig. 3, showing the general case, and then to Fig. 4, showing the special case adopted in Figs. 1 and 2.

In Fig. 3 similar parts to those in Figs. 1 and 2 are given similar reference numerals with the letter *b*.

To simplify the diagram, Fig. 3, the lower two louvers corresponding to 12 and 13 are represented as flat plates 12b, 13b, omitting the overlap flanges, and the frame 6b is shown in outline. Two positions are shown:

(1) A full line position in which the louvers are closed.

(2) A dotted line open position assumed to be reached by holding louver 12b fixed and swinging frame 6b counter-clockwise 90° about shaft 9b.

In the dotted line position louver 13b must be parallel to 12b. Having so drawn it lay out arm 25b at any suitable angle to the louver 13b and of any suitable length. Draw this arm for both the full and dotted line position. This gives the two limiting positions for pin 26b. Connect the centers of these pins in the two positions by line UV. Erect the perpendicular bisector of this line UV which is designated as WX. Draw the line UY connecting center of pin 26b (full line position) with center of shaft 9b. The point Z, the intersection UY and WX is the limiting position of 28b. This cannot be further to the right or louver 13b would be subject to initial backward motion as louver 12b starts to open (clockwise). It can be at Z if louver 12b is moved by the damper motor. If the damper motor is to drive louver 13b the point 28b should be located slightly to the left, for example, at Z′, so that link and arm will not align.

Such a location is shown in Fig. 4 which gives the layout preferred and actually used in Figs. 1 and 2. In Fig. 4 parts are numbered as in Figs. 1 and 2. In this diagram arm 25 is normal to louver 13 and its radial length from center of shaft 11 to center of pin 26 is ½ the distance on centers between shafts 9 and 11. Hence UV is necessarily parallel with the closed plane of the louvers and WX is perpendicular thereto. Stated differently, line WX is the perpendicular bisector of the line connecting the centers of shafts 9 and 11. The point Z is the intersection of WX and UY. Z′, slightly to the left of Z is chosen as the center of pin 28 (damper closed position). This gives a compact structure in which either set of louvers may be driven by the damper motor. While Z′ can be displaced further to the left, i. e., toward frame 6, the effect is to diminish the opening lead of louver 12 with respect to louver 13.

What is claimed is:

1. The combination of a frame; a pair of louvers pivoted therein with their edges in overlapping arrangement, and arranged to open by rotating in relatively reverse angular directions; lever arms carried by said louvers; and a link connecting said lever arms, the parts being so arranged that in the closed position the perpendicular to the link from the axis of that louver whose edge leads in the opening movement will be shorter than the perpendicular to the link from the axis of the other louver.

2. The combination of a frame; a pair of louvers pivoted therein with their edges overlapping when the louvers are closed, and the louvers opening by rotating reversely with respect to each other; approximately equal lever arms, one on each louver; and a link of approximately the same length as said arms connecting the arms, the lever arm on the louver whose edge is overlapped and hence trails in opening being substantially normal to the plane of its louver and the lever arm on the louver which laps and hence leads in opening being at a small angle to the plane of such louver, whereby the perpendicular to the link from the axis of the leading louver is comparatively short when the louver is closed and initial opening motion of the leading louver is more rapid than that of the trailing louver.

3. The combination of a frame; a pair of louvers pivoted therein on parallel axes with their edges overlapping when the louvers are closed, and the louvers opening by rotating reversely with respect to each other; lever arms on said louvers, the arm on the louver which trails in opening having a length equal to half the distance between said parallel axes; and a link connecting said arms and hinged to each, the parts being so arranged that when the louvers are closed the arm on the trailing louver is normal to the plane of said frame, and, at least when considered as projected on a common plane normal to the axes of the louvers, the center line of the pin connecting the arm on the leading louver with said link is on a line perpendicular to and bisecting the line connecting said axes and at least closely adjacent to the intersection of said bisecting line with a line connecting the axis of the leading louver with the center line of the pin connecting the link with the arm on the trailing louver.

4. The combination of a frame; a pair of louvers pivoted therein with their edges in overlapping arrangement, and arranged to open by rotating in relatively reverse angular directions; lever arms carried by said louvers; and a link connecting said lever arms, the parts being so arranged that in the closed position the perpendicular to the link from the axis of that louver whose edge leads in the opening movement will be shorter than the perpendicular to the link from the axis of the other louver, and in the open position the louvers will be parallel with each other.

ARTHUR J. OTTO.